United States Patent Office 2,872,320
Patented Feb. 3, 1959

2,872,320

PREPARATION OF MIXTURES OF AMINO ACIDS

Karl Arvid Johannes Wretlind, Stockholm, Sweden

No Drawing. Application September 6, 1957
Serial No. 682,298

Claims priority, application Sweden September 10, 1956

8 Claims. (Cl. 99—14)

This invention relates to the preparation of mixtures of amino acids such as are suitable for administration to man as nutrient materials.

During the last few years amino acids have come increasingly into therapeutic use. Amino acids have been administered clinically substantially in the form of preparations containing all of the essential amino acids. Amino acid preparations are of particular use when enteral or peroral administration is for some reason excluded, the amino acids then being administered parenterally. Body protein can be synthesized if amino acids are injected parenterally, which is similar to the normal process, with however the difference that the amino acids in the former case penetrate into the blood from the intestinal tract and in the latter case are administered directly intravenously.

Different types of amino acids are used therapeutically. A mixture of pure amino acids may be used but the isolation of the individual pure amino acids is so costly that the use of this type of preparations has been very limited. Usually amino acid preparations are used which are obtained by hydrolysis of proteins, such as casein. The hydrolysis may be carried out by means of mineral acids or enzymes. Free amino acids are obtained by acid hydrolysis but the method has disadvantages since the vitally important or essential amino acid, tryptophane, is destroyed, and has therefore to be added to the hydrolysate, and the growth factor, strepogenin, is destroyed. Moreover, it is technically very difficult to remove from the product the acid used for the hydrolysis.

Enzymic hydrolysis is therefore more preferably used and yields a preparation containing free amino acids and in addition always a certain amount of peptides, due to the fact that enzymic hydrolysis is not quite so complete as acid hydrolysis. No amino acids are destroyed during the enzymic hydrolysis and the growth factor, strepogenin, is preserved intact. Several different types of amino acid preparations, manufactured by enzymic hydrolysis, are available. The most important difference between them is the degree of hydrolysis, i. e. the contents of free amino acids in the preparations. Several amino acid preparations contain less than 50% amino acids in the free form, the main part of the amino acids being present in the form of peptides. Among the available amino acid preparations containing more than 50% of the amino acids in the free form there are certain differences with respect to the contents of free amino acids as well as with respect to the degree of purification. Certain enzymic casein hydrolysates are used without further purification. In other cases amino acid preparations prepared by enzymic hydrolysis have been subjected to a dialysis for the removal of undesirable high molecular constituents. This removal of high molecular pyrogenous substances, non-digested protein and high molecular peptides, which may cause allergic or anaphylactic reactions, has been shown to be of importance for reducing the high frequency of side reactions.

However, when such amino acid mixtures are administered intravenously either rapidly or in large quantity, certain side reactions tend to arise so that the patient feels sick and vomits. It is known by various investigations that these side reactions are caused by glutamic acid. It is an object of this invention to provide a method whereby these side reactions may be avoided.

According to the present invention a method for the production of mixtures of amino acids suitable for use as nutrient material comprises subjecting protein to enzymic hydrolysis, simultaneously or subsequently subjecting the products to treatment at a temperature above 30° C., for such a time that at least part of the glutamic acid and derivatives thereof liberated during the hydrolysis are transformed to pyrrolidone carboxylic acid, and subjecting the final products to purification by dialysis. The pyrrolidone carboxylic acid does not show said side reactions.

The transfer to pyrrolidone carboxylic acid is preferably carried out by heat treatment of the amino acid mixture obtained after the hydrolysis but may, however, be carried out simultaneously with the hydrolysis. The glutamic acid or its amide, glutamine, liberated during the hydrolysis is transformed to pyrrolidone carboxylic acid according to the following formulae.

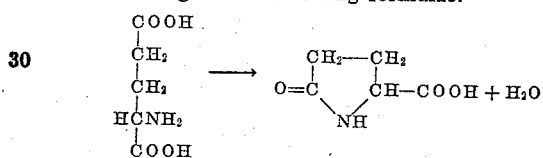

and

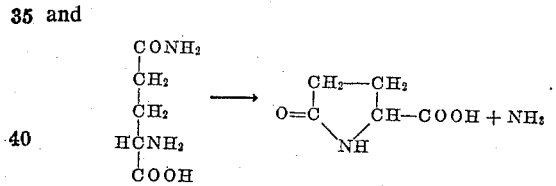

The heat treatment is preferably carried out for such a time that the content of pyrrolidone carboxylic acid amounts to at least 1.5-2%, preferably 4-8%, of the total quantity of amino acids in the preparation.

Preferably the amino acid mixture is prepared by subjecting proteins, such as casein, blood protein and the like to an enzymic hydrolysis with trypsin, erepsin and the like until no further increase of the amino nitrogen is obtained. Thereafter the liquid is evaporated to a thickly liquid consistency and is kept at a temperature above 30° C., preferably 75-80° C., until the desired content of pyrrolidone carboxylic acid is obtained. During this heat treatment the pH value of the solution is preferably kept at about 4 to 8.5. The amino acid mixture is then purified by dialysis and is diluted to a concentration suitable for injection. After sterilization and biologic testing the amino acid mixture may be used for intravenous administration in man.

The following example will serve to illustrate the invention:

*Example*

50 kg. of casein are added to 1000 litres of water and such a quantity of sodium hydroxide is added that the pH value is 7-8.5. Toluene is used as preservative. Thereafter 0.3 kg. of pancreas powder and 0.1 kg. of a preparation containing erepsin or a polypeptidase preparation from the mucous membrane of the intestine are added. The mixture is kept at 37° C. and the digestion is carried on until no further increase of free amino nitrogen takes place. The mixture is concentrated to about 200 litres and is heated for 3 days at 75° C. or 4 days at 55° C. By analysis it is found that the content of pyrrolidone carboxylic acid lies between 3 and 8%. The product is then subjected to dialysis.

What I claim is:

1. A method for the production of mixtures of amino acids for use as nutrient material which comprises subjecting protein to enzymic hydrolysis to form amino acids therefrom including glutamic acid and derivatives thereof, subjecting the amino acid product to treatment at a temperature above 30° C. for such a time that at least part of the glutamic acid and derivatives thereof liberated during the hydrolysis are transformed to pyrrolidone carboxylic acid, and subjecting the final products to purification by dialysis.

2. A method according to claim 1 wherein the heat treatment is effected at 75–80° C.

3. The method of claim 1 wherein the heat treatment is carried out for such time that the pyrrolidone carboxylic acid content amounts to at least 1.5–2% of the total amount of amino acids in the product.

4. The method of claim 2 wherein the heat treatment is carried out for such time that the pyrrolidone carboxylic acid content amounts to at least 1.5–2% of the total amount of amino acids in the product.

5. The method of claim 1 wherein the heat treatment is carried out for such time that the pyrrolidone carboxylic acid content amounts to at least 4–8% of the total amount of amino acids in the product.

6. The method of claim 2 wherein the heat treatment is carried out for such time that the pyrrolidone carboxylic acid content amounts to at least 4–8% of the total amount of amino acids in the product.

7. The method of claim 1 wherein the heat treatment is carried out simultaneously with the hydrolysis.

8. The method of claim 1 wherein the amino acid product is concentrated after hydrolysis and is thereafter subjected to heat treatment.

References Cited in the file of this patent

UNITED STATES PATENTS

| | | |
|---|---|---|
| 2,364,008 | Stuart | Nov. 28, 1944 |
| 2,454,915 | Fevold et al. | Nov. 30, 1948 |
| 2,473,255 | Parfentjev | June 14, 1949 |

OTHER REFERENCES

"Organic Chemistry" by Karrer, Nordeman Publishing Co., Inc., New York (1938), page 263.

"Advances in Protein Chemistry," Anson et al., vol. VI, Academic Press Inc., Publishers, New York, New York, pages 334 and 335.